D. J. OWEN.
Animal-Traps.
No. 138,275.  Patented April 29, 1873.
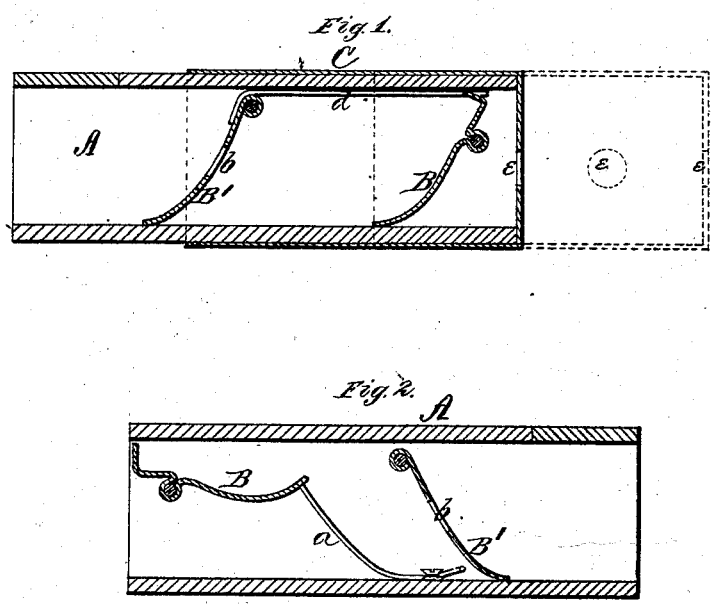

UNITED STATES PATENT OFFICE.

DEMUS J. OWEN, OF SPRINGVILLE, PENNSYLVANIA.

IMPROVEMENT IN ANIMAL-TRAPS.

Specification forming part of Letters Patent No. 138,275, dated April 29, 1873; application filed March 10, 1873.

*To all whom it may concern:*

Be it known that I, DEMUS J. OWEN, of Springville, in the county of Susquehanna and State of Pennsylvania, have invented certain new and useful Improvements in Animal-Traps; and I do hereby declare that the following is a full, clear, and exact description thereof, that will enable others skilled in the art to which it appertains to make and use the same, reference being had to the accompanying drawing and to the letters of reference marked thereon which form a part of this specification.

The nature of my invention consists in the construction and arrangement of an animal-trap, as will be hereinafter more fully set forth.

In the accompanying drawing, both Figures 1 and 2 represent longitudinal vertical sections of my animal-trap, showing both sides of the interior of the same.

A represents a rectangular box of any suitable dimensions, open at both ends, and provided at or near each end with a drop or gate, B B'. These drops or gates are made of sheet metal or other suitable material, hung on rods in the sides of the box, and curved in the manner shown in the drawing. The drop or gate B at the front end of the box A is raised and held by a wire, $a$, as shown in Fig. 2, when the trap is set, while the gate B' at the other end is closed. The rear end of the box A should open into a closed box or barrel, in which the animal will be confined when caught in the trap. When the animal enters through the front gate it will step on the wire $a$, which releases the front gate and allows the same to fall or drop behind the animal. In the rear gate or drop B' is an aperture, $b$, which entices the animal to pass under said gate, and in raising said gate to pass under it a wire, $d$, attached to the same and extending forward raises the front gate again. As soon as the animal passes under the rear gate said gate drops and shuts the animal in, when it will pass into the box or barrel placed for receiving the same. C represents a metal sliding box placed over the front end of the box A and provided with apertures $e\ e$. When not in use this sliding box can be shut up on the main box, but when in use it is drawn off and placed over the rear end to hold the mice or small game when caught.

Having thus fully described my invention, what I claim as new, and desire to secure by Letters Patent, is—

1. The arrangement of the drops or gates B B' and the wires $a$ and $d$, substantially as shown and described in the box A, and for the purposes herein set forth.

2. In combination with the above, the sliding box C, for the purposes herein set forth.

In testimony that I claim the foregoing I have hereunto set my hand.

DEMUS J. OWEN.

Witnesses:
MILES PRICHARD,
H. K. SHERMAN.